INVENTOR.
ELMER G. JOHNSON
BY Charles J. Ungemach
ATTORNEY

Aug. 12, 1969

E. G. JOHNSON 3,460,554

CONTROL APPARATUS

Filed Aug. 25, 1966

INVENTOR.
ELMER G. JOHNSON
BY Charles J. Ungemach
ATTORNEY

United States Patent Office 3,460,554
Patented Aug. 12, 1969

3,460,554
CONTROL APPARATUS
Elmer G. Johnson, White Bear, Minn., assignor to Honeywell Inc., Minneapolis, Minn., a corporation of Delaware
Filed Aug. 25, 1966, Ser. No. 575,062
Int. Cl. F02k *11/00;* F15c *1/08*
U.S. Cl. 137—15.2                                    7 Claims

ABSTRACT OF THE DISCLOSURE

Apparatus for positioning a shock wave in the diffuser section of a jet engine comprising a plurality of fluid amplifiers each controlled by a signal from a pressure tap located along the diffuser section, summing means connected to receive and sum the output signals from the fluid amplifiers, and means responsive to the signal from the summing means for controlling the position of the shock wave. In operation, a varying number of the fluid amplifiers, depending on the position of the shock wave, supply signals to the summing means.

---

This invention relates to a fluid system and more particularly to a fluid shock wave sensing and positioning system.

In the operation of ram-jet or turbo-jet aircraft engines it is desirable, for reasons of efficiency, that the pressure head at the input to the combustion chamber or compressor inlet and the mass rate of flow of air into the chamber be as large as possible. A diffuser section is included in a position forward of such engines, particularly those intended for use at supersonic speeds, to decelerate the supersonic flow to a subsonic level. The diffuser section is generally a fluid passage which converges down to a minimum area known as the diffuser throat and then diverges to an interface with the engine. While it would be desirable to perform the deceleration without going through a shock process, this is impossible as a practical matter. The best that can be accomplished is to position the inevitable shock wave at such a location in the diffuser throat as will result in maximum efficiency.

Systems are known for detecting the location of a shock wave in a diffuser and optimizing that position by adjusting the geometry of the diffuser, by modifying the pressure gradient, and by use of other suitable expedients. Such systems have used various combinations of electrical, electromechanical, hydromechanical, and fluid dynamic components having varying degrees of complexity.

A principal object of the present invention is to provide a simple, efficient and economical system for sensing and controlling the position of the shock wave in a diffuser throat, the system having a minimum number of moving parts and including means actuated directly by fluid flowing into the diffuser for sensing the position of the shock wave.

Briefly, the applicant's invention comprises fluid amplifier means for sensing the position of a shock wave and for comparing a signal indicative of the actual position of the shock wave with a signal indicative of the desired position thereof. In addition, means is provided for locating the shock wave in the desired position by altering the back pressure within the diffuser.

Figure 1:
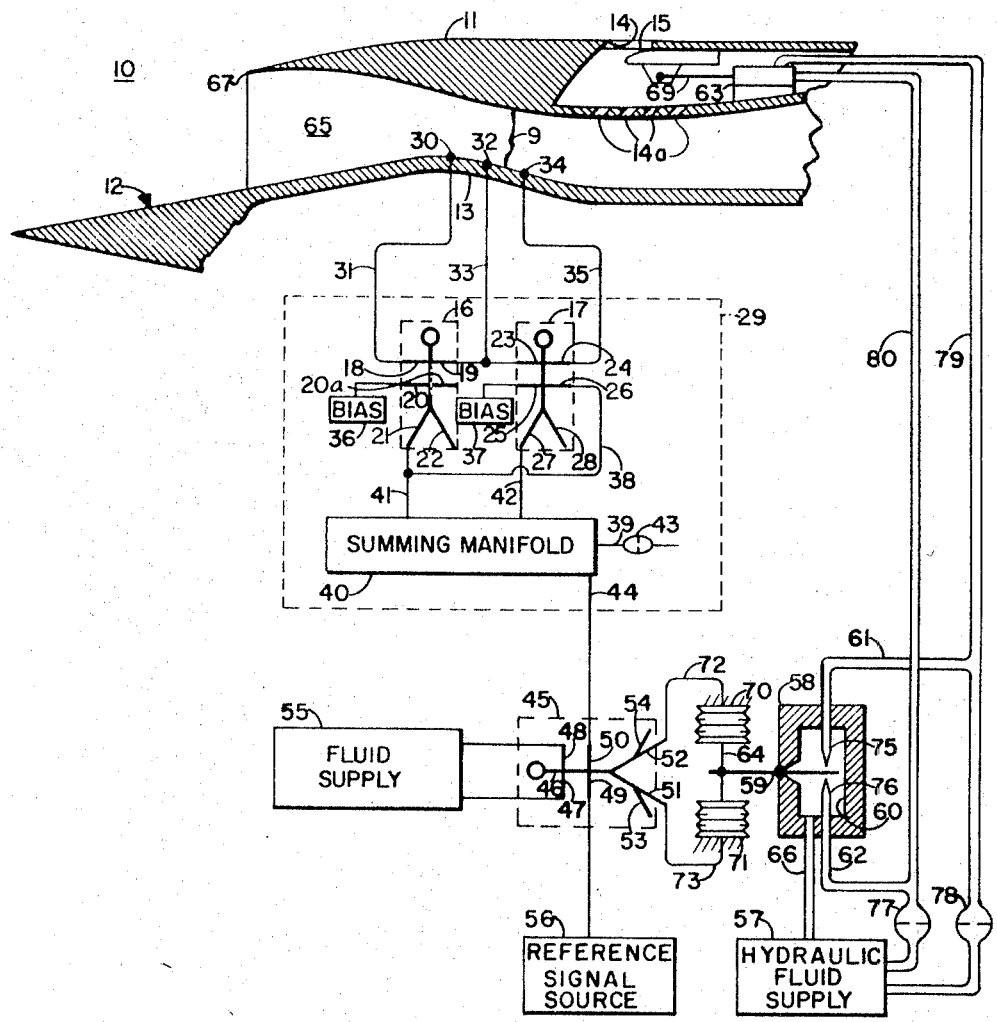
Figure 2:
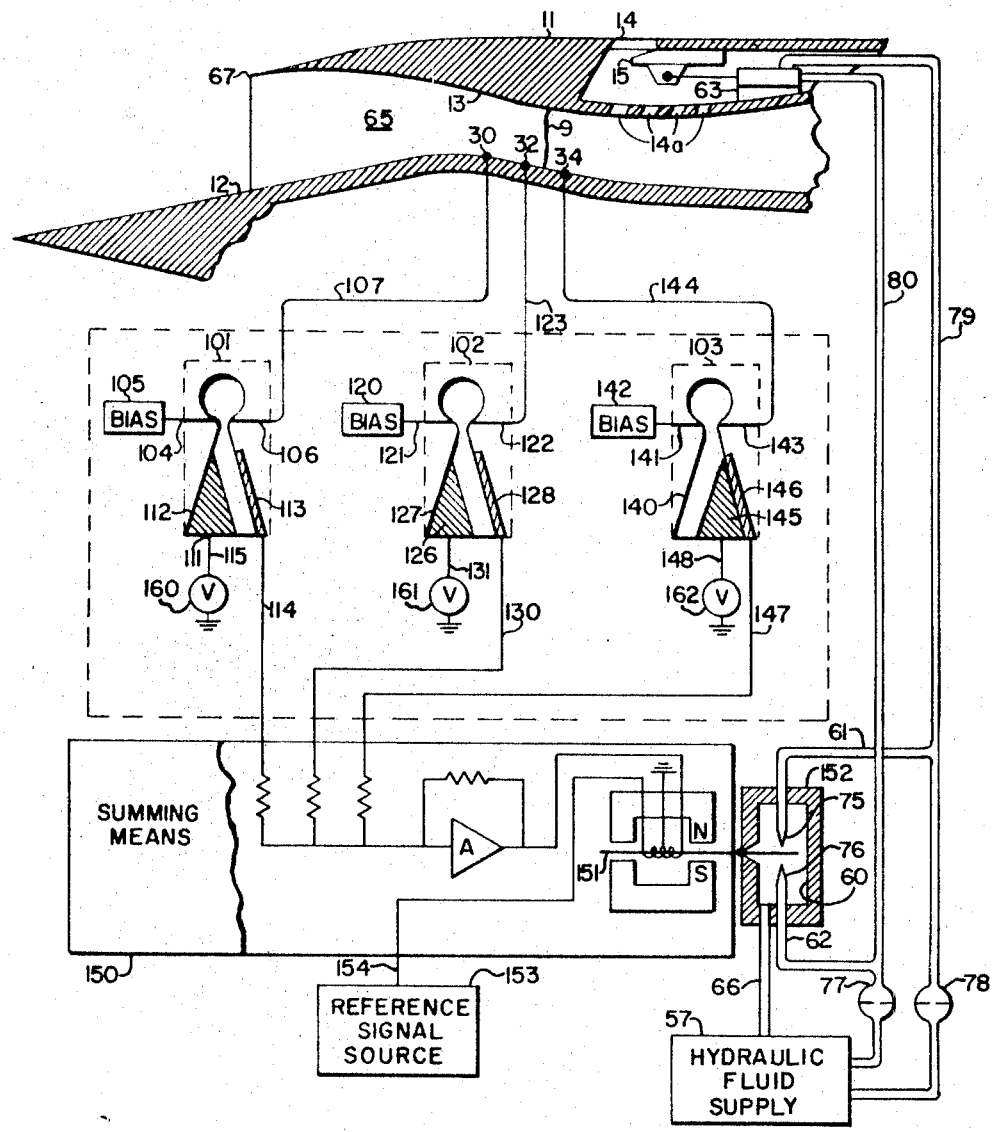

The operation of applicant's device will become apparent when studied in conjunction with FIGURE 1, which discloses one embodiment of the applicant's shock sensor and system partly in schematic form; and FIGURE 2, which discloses an alternate embodiment of the applicant's shock sensing and positioning system partly in schematic form.

Referring to FIGURE 1, reference numeral 10 generally identifies the applicant's shock sensing and positioning system. An outer cowling 11 and a spike 12 both shown in fragmentary section comprise the diffuser of an aircraft engine. A diffuser throat 13 is shown at the position of minimum area between the cowling 11 and spike 12. Located in cowling 11 is a vent 14 whose area is adjustable by a closure or vent door 15 for varying the back pressure in the diffuser through series of holes designated by reference numeral 14a.

A plurality of static pressure taps for measuring fluid pressure, 30, 32 and 34 are provided in diffuser throat 13. As shown, tap 30 is located nearer to the inlet to diffuser throat 13 than is tap 34.

In order to determine the position of a shock wave in throat 13 there is shown a sensing assembly 29 including a summing manifold 40 and a plurality of fluid amplifiers 16 and 17. The number of amplifiers used is selected in accordance with the desired design requirements. In a normal design, fluid amplifiers would measure pressure as far forward as edge 67 of cowling 11. For example, if an additional amplifier were installed in the system, one of the control ports of the additional amplifier would be connected to an additional static tap located ahead of static tap 30, while the other control port would be connected to static tap 30 through conduit 31 as fluid amplifier control ports 19 and 23 are connected to static pressure tap 32. The outlet of the additional fluid amplifier would be connected to summing manifold 40 and fluid amplifier control port 20a similar to the way fluid amplifier outlet 21 is connected to summing manifold 40 and control port 26. For illustrating the operation of the system only two bistable amplifiers 16 and 17 are shown. Fluid amplifier 16 has a power fluid inlet, a plurality of control ports 18, 19, 20 and 20a, and a pair of outlets 21 and 22. Similarly, fluid amplifier 17 has a power fluid inlet, a plurality of control ports 23, 24, 25 and 26 and a pair of outlets 27 and 28.

Control port 18 is connected to static pressure tap 30 by conduit 31. Control ports 19 and 23 are connected to static pressure tap 32 by a conduit 33. Control port 24 is connected to static tap 34 by conduit 35. Control port 20 is connected to a fluid biasing means 36 and control port 25 is connected to a fluid biasing means 37. Outlets 21 and 27 are connected to summing manifold 40 by conduits 41 and 42 respectively. Outlets 22 and 28 act as vents for exhausting fluid without affecting the summing manifold 40. A connection is made from control port 26 to outlet 21 by a conduit 38.

The manifold 40 comprises a closed chamber continuously vented by a first outlet conduit 39 which includes a restriction or fluid resistor 43, and having an outlet conduit 44 which supplies a fluid signal determined by the signals in conduits 41 and 42, which supply fluid to the manifold. That is, the fluid resistor 43 has an opening somewhat smaller than the fluid inlets provided by conduits 41 and 42 so that the fluid pressure within manifold 40 increases to a value determined by the quantity of fluid supplied thereto.

System 10 also includes a control assembly comprising a fluid amplifier 45, a source 55 of variable pressure, a reference signal source of pressure 56, a pilot valve 58, a hydraulic fluid supply 57 and a fluid servo 63. Fluid amplifier 45 has a power nozzle 46, a first set of control ports 47 and 48, a second set of control ports 49 and 50, a first receiver outlet leg 51 and a second receiver outlet leg 52. Located in receiver outlet legs 51 and 52 respectively are two vent passages 53 and 54 for venting excess fluid.

Control ports 47 and 48 are connected to source 55, control port 50 is connected to outlet conduit 44 of manifold 40, and control port 49 is connected to reference signal source 56.

Pilot valve 58 is shown to comprise a chamber 60 into which a pair of nozzles 75 and 76 project in spaced opposed relation. A flapper 59 extends between nozzles 75 and 76 and is pivoted in fluid tight relation to the chamber. Outside chamber 60 flapper 59 is connected to a link 64 between a pair of bellows 70 and 71, the other ends of which are fixed in position by suitable means shown as cross hatching in the drawing. A drain conduit 66 communicates with the inside of chamber 60.

Hydraulic fluid source 57 supplies power fluid to servo 63 through conduits 79 and 80 which include restrictions 78 and 77 respectively, and drain conduit 66 is connected to the input of supply 57. The conduit 80 is tapped to supply fluid through conduit 62 to the nozzle 76 and the conduit 79 is tapped to supply fluid through a conduit 61 to the nozzle 75. Servo 63 is arranged to open vent 14 by suitable linkage 69 when the pressure in conduit 80 exceeds that in conduit 79, and to close vent 14 when the pressure relation is reversed. When the pressures are equal, servo 63 holds closure 15 in its present location.

The pressures supplied to servo 63 from the common hydraulic fluid supply 57 are equal when flapper 59 is midway between nozzle 75 and 76 so that the pressure drops at the nozzles are equal. If flapper 59 pivots counter-clockwise to a position where it is closer to nozzle 75, the fluid resistance offered by nozzle 75 increases, raising the pressure in conduit 79, and the fluid resistance offered by nozzle 76 decreases, lowering the pressure in conduit 80, so that servo 63 moves closure 15 to the left closing vent 14 further. If flapper 59 pivots clockwise the opposite chain of events occurs.

For purposes of explaining the operation of FIGURE 1, assume that the desired location of the shock wave is that shown by reference numeral 9. It is known that the pressure forward of a shock wave is much less than the pressure rearward. Thus in FIGURE 1, the pressure received by static taps 30 and 32 is substantially equal, but is much less than the pressure received by static tap 34. Thus the pressures in control ports 18 and 19 of fluid amplifier 16 are substantially the same so that they produce no control effect on the fluid stream in amplifier 16. However, biasing means 20 supplies a signal to insure that, with no differential signal at control ports 18 and 19, the fluid stream flows out vent leg 22.

With the shock wave 9 positioned as shown in FIGURE 1, a pressure differential exists across control ports 23 and 24, in a sense to divert the fluid stream into outlet 27. It will be noted that biasing means 37 supplies a signal to control port 25, but the biasing signal is of lesser magnitude than the signal at control port 24 so that a pressure signal in control port 24 will overcome the biasing signal. Thus the fluid flows through outlet 27 and fluid passage 42 into summing manifold 40. This results in an increase of pressure in summing manifold 40. The fluid resistor 43 has an opening somewhat smaller than the fluid inlets provided by conduits 41 and 42 so that the pressure builds up within the summing manifold 40 to a value determined by the quantity of fluid being supplied from the fluid amplifiers 16 and 17 to the manifold 40. For purposes of illustration, it will be assumed that with one fluid amplifier exhausting into summing manifold 40 one unit of pressure is generated within manifold 40 and that when two fluid amplifiers are exhausting into summing manifold 40 two units of pressure are generated therein.

Signals are transmitted from summing manifold 40 through conduit 44 to fluid amplifier 45. Fluid amplifier 45 functions as a means for comparing the fluid pressure signals from manifold 40 with a reference fluid pressure signal from the reference signal source 56. Reference signal source 56 may be a pressure regulator or the like for supplying fluid at a desired pressure level.

The operation of fluid amplifier 45 as a summing device is as follows: Suppose there is a reference signal of one pressure unit generated at signal source 56. With the shock wave 9 in the position shown in FIGURE 1, amplifier 16 is exhausting out vent leg 22 while amplifier 17 is exhausting out of outlet 27 into the summing manifold 40 resulting in a pressure signal of one unit in summing manifold 40. Thus, with one unit of pressure generated within summing manifold 40 the signal to fluid amplifier 45 is one unit of pressure in control port 50 and one unit of pressure in control port 49. With equal pressures in control ports 49 and 50, the fluid flowing through amplifier 45 splits equally into legs 51 and 52 and the pressures in bellows 70 and 71 are equal. Therefore the flapper 59 stays in the position shown and there is no change in the position of servo 63.

Suppose now that the shock wave 9 moves forward into a position between static pressure taps 30 and 32. A pressure differential now exists between control ports 18 and 19 of fluid amplifier 16. This control signal has a sense that diverts the fluid flowing in fluid amplifier 16 to outlet leg 21. The fluid flowing in outlet leg 21 subsequently flows into summing manifold 40 through conduit 41 and also supplies a signal to fluid amplifier 17 through conduit 38. This signal to fluid amplifier 17 is delivered through control port 26. The signals at control ports 23 and 24 will now be substantially equal since static taps 32 and 34 are now located on the same side of shock wave 9, but the signal at control port 26 overcomes the signal from bias 37 and causes the fluid flowing within fluid amplifier 17 to flow into outlet leg 27 and hence into summing manifold 40 via conduit 42. Thus, there are two units of pressure now generated within summing manifold 40. With two units of pressure generated within summing manifold 40 the signal supplied to control port 50 of fluid amplifier 45 via conduit 44 has a pressure of two units and tends to deflect the fluid stream within fluid amplifier 45 into the outlet leg 51. It will be recalled that a reference signal source of one pressure unit was applied originally to control port 49 of fluid amplifier 45. Thus, there is a net pressure differential signal of one pressure unit in the control ports 50 and 49 of fluid amplifier 45. This pressure differential signal is reflected in a larger output signal in outlet 51, that consequently flows into fluid bellows 71, resulting in a clockwise motion of the flapper 59. The outlet in front of nozzle 76 is decreased thereby increasing the pressure in conduit 62. The increase pressure in conduit 62 is reflected into servo motor 63 resulting in the movement of vent door 15 to the right in the drawing or in a rearward manner. The movement of vent door 15, results in less back pressure within chamber thereby causing the fluid shock wave 9 to move rearward toward the original position shown in FIGURE 1.

Now suppose a change in flight conditions occurs that causes the shock wave 9 to move behind static pressure tap 34. There is now no pressure differential existing across static taps 30, 32 or 34. Consequently, the signals from bias 36 and bias 37 act to cause the fluid to flow into vent legs 22 and 28 of fluid amplifiers 16 and 17 respectively. There is no pressure signal generated in summing manifold 40 and hence no signal in control port 50 of fluid amplifier 45. The reference signal of one pressure unit is still applied to control port 49 of fluid amplifier 45 so that the fluid in amplifier 45 flows out of outlet leg 52 and through conduit 72 to bellows 70. Flapper 59 is deflected toward nozzle 75 thereby increasing the pressure in fluid conduits 61 and 79. The increase in pressure in fluid conduit 79 causes vent door 15 to move forward, thereby increasing the back pressure within chamber 65 and so causing the fluid shock wave to move forward of static pressure tap 34.

It is thus seen that the apparatus of FIGURE 1 operates to maintain the shock wave 9 in the desired position between static taps 32 and 34.

If it were desired to have shock wave 9 maintain a position between static taps 30 and 32, the output from the reference signal source 56 could be made to be two units of pressure instead of one. Under such circumstances, when the shock wave is between static taps 32 and 34, the output of the summing manifold 40 would be one unit of pressure which, when compared with the two units of pressure from signal source 56, would operate flapper 59 counterclockwise thus causing closure 15 to move forward increasing the back pressure in the diffuser and moving the shock wave 9 forward. When the shock wave 9 moved between static taps 30 and 32, the output from manifold 40 would be two units of pressure and the system would be balanced. In other words the fluid shock wave 9 maintains a position according to the reference signal applied at control port 49 of fluid amplifier 45.

Referring now to FIGURE 2, an alternate embodiment of the applicant's invention is disclosed. Fluid amplifiers 101, 102, and 103 are shown as the shock sensing fluid amplifiers. Fluid amplifiers 101, 102, and 103 are of a type shown in my Patent No. 3,171,915.

Fluid amplifier 101 is shown with a first control port 104, a second control port 106, a fluid biasing supply 105, a power nozzle, a movable member 111, a wall 112, and a contact member 113. Fluid amplifier 102 has a power nozzle, a first control port 121, a second control port 122, a fluid biasing supply 120, a movable member 126, a wall 127, and a contact member 128. Fluid amplifier 103 has a power nozzle, a first control port 141, a second control port 143, a fluid biasing supply 142, a movable member 145, a wall 140, and a contact member 146. Contact members 113, 128 and 146 serve as outlets for a signal from amplifiers 101, 102, and 103 respectively in the same manner as fluid amplifier outlet legs 21 and 27 in fluid amplifiers 16 and 17 of FIGURE 1 do.

A conduit 107 connects static pressure tap 30 to second control port 106 of fluid amplifier 101. A second conduit 123 connects static pressure tap 32 to second control port 122 of fluid amplifier 102. A third conduit 144 connects static pressure tap 34 to second control port 143 of fluid amplifier 103.

A summing means 150 is shown for algebraically summing the outlet signal from the fluid amplifiers 101, 102, and 103 in an electrical manner similar to the fluid signal summing function performed by the fluid summing manifold 40 and fluid amplifier 45 shown in FIGURE 1.

A conductor 115 connects movable member 111 in fluid amplifier 101, to a voltage source 160 and a conductor 114 connects contact member 113 to summing means 150. A conductor 131 connects movable member 126 in fluid amplifier 102, to voltage source 161 and a conductor 130 connects contact member 128 to summing means 150. A conductor 148 connects movable member 145 in fluid amplifier 103 to a voltage source 162 and a conductor 147 connects contact member 146 to summing means 150.

Summing means 150 is connected by a flapper 151 to a pilot valve 152 that operates in the same manner as the aforedescribed pilot valve 58 of FIGURE 1. The rest of the parts of the pilot valve 152 are similar to pilot valve 58 and have the same reference numerals as their counterparts in pilot valve 58. Likewise, other parts similar to those shown in FIGURE 1, have the same reference numerals as their counterparts in FIGURE 1.

An electrical signal source 153, analogous to the fluid reference signal source 56, is shown for applying a signal to summing means 150 through conductor 154.

With shock wave 9 positioned as shown in FIGURE 2, a pressure differential exists across control ports 141 and 143 in a sense to divert movable member 145 into contact with contact member 146. It will be noted that biasing supply 142 supplies a signal to control port 141, but the biasing signal is of a lesser magnitude than the signal from control port 143 so that a pressure signal in control port 143 will overcome the biasing signal. Thus, the fluid flows along wall 140 and causes movable member 145 to be in contact with contact member 146. The location of movable member 145 in contact with contact member 146 creates a closed circuit between voltage source 162 and summing means 150. The low static pressure signal in static pressure tap 32 is conveyed through conduit 123 to second control port 122 of fluid amplifier 102. The biasing signal 120 is greater than the low static pressure in front of the shock wave 9, so that movable member 126 is caused to be located against wall 127. The location of movable member 126 against wall 127 leaves an open circuit between voltage source 161 and summing means 150. The low static pressure signal on static pressure tap 30 is conveyed through conduit 107 to second control port 106 of fluid amplifier 101. The biasing signal 105 is greater than the low static pressure in front of the shock wave 9 so that movable member 111 is caused to be located against wall 112. The location of movable member 111 against wall 112 leaves an open circuit between voltage source 160 and summing means 150. Hence, only voltage source 162 is supplying an electrical signal to summing means 150.

For purposes of explanation it will be assumed that a one-volt signal from voltage source 162, is supplied to summing means 150 through conductor 148, movable member 145, contact member 146, and conductor 147. It will also be assumed that reference signal source 153 supplies a one-volt signal of opposite polarity from voltage source 162 to summing means 150. The one-volt signal generated by voltage source 162 and the one-volt reference signal of opposite polarity supplied by source 153 to summing means 150 have a mutually cancelling effect on the output of summing means 150. Hence, the flapper 151 does not rotate and the vent door 15 consequently remains in the position shown in FIGURE 2. With the vent door 15 in a fixed position, the shock wave 9 maintains its position between static pressure taps 32 and 34 during steady state conditions.

If a slight disturbance in the air causes shock wave 9 to move forward into a position between static pressure taps 30 and 32, a high pressure signal exists in static pressure tap 32 and is transmitted to fluid amplifier control port 122 through conduit 123. The high pressure signal causes movable member 126 to be moved adjacent to contact member 128 thereby closing the circuit between voltage source 161 and summing means 150. It will be assumed that voltage source 161 supplies a one-volt signal of the same polarty as does voltage source 162 to summing means 150. With the two-volt signal supplied by voltage sources 161 and 162 and the reference signal of opposite polarity of one volt generated by reference signal source 153, a net differential signal of one volt exists in summing means 150. The one-volt signal causes flapper 151 to rotate clockwise about its pivot point, resulting in a fluid signal through conduits 80 and 79 causing shock wave 9 to move in a rearward manner towards static pressure taps 32 and 34. This means that vent door 15 is moving rearward to allow vent 14 to open, thereby reducing the pressure behind shock wave 9 and allowing shock wave 9 to be swallowed further.

Suppose now that shock wave 9 is swallowed behind static pressure tap 34 by a variation in the velocity of the aircraft. Now the high pressure signal no longer exists in static pressure tap 34 and consequently only low pressure signals are generated in static pressure taps 30, 32, and 34. The biasing signals present in biasing means 105, 120, and 142 are then the predominant fluid control signals and cause movable members 111, 126, and 145 to be in contact with walls 112, 127, and 140 respectively. In this position, none of the voltage source 160, 161, or 162 are connected to the summing means 150. Hence, no electrical signal is supplied to the summing means through fluid amplifiers 101, 102, and 103. The only electrical signal present in summing means 150 is then the one-volt reference signal from reference signal source 153. With the one-volt reference signal present in summing means 150, the flapper is caused to rotate counterclockwise resulting in a pressure signal in servo 63 through conduits 80 and 79. The pressure signal in conduits 80 and 79 causes the vent door 15 to move forward, thereby increasing the back pressure within diffuser 65 resulting in the shock wave moving forward to a position between static pressure taps 32 and 34.

As with FIGURE 1, adjusting the output from reference signal source 153 to two volts would cause the system to balance when the shock wave 9 was between static taps 30 and 32. Thus, it can be seen that the shock wave is positioned or located about a point determined by the level of the reference signal source.

It can be seen from the above description, that the system operation of the shock sensor using fluid amplifiers as shown in 3,171,915 is substantially the same as it was in the shock sensing system of FIGURE 1. However, instead of being limited to only fluid summing means as in FIGURE 1, the device shown in FIGURE 2 can make use of an electrical summing means to perform the same function, and yet offer the reliability and low cost of fluid amplifiers for the sensing system.

While I have shown and described specific embodiments of this invention further modifications and improvements will occur to those skilled in the art. I desire it to be understood therefore that this invention is not limited to the particular form shown and I intend in the appended claims to cover all modifications which do not depart from the spirit or scope of this invention.

I claim:
1. In combination with apparatus of the type wherein a shock wave is produced in fluid flowing through a duct, and wherein the duct includes a plurality of pressure taps spaced along the length thereof, the improvement which comprises:
    a plurality of fluid amplifiers, each having a power nozzle for issuing a power fluid stream and a fluid receiver adapted to receive the power fluid stream, the fluid receiver including a signal output, each of said fluid amplifiers further having first and second control ports adapted to direct opposing control streams transversely against the power fluid stream so as to cause a signal at the signal output of the amplifier if a fluid pressure signal supplied to the second control port exceeds a fluid pressure signal supplied to the first control port by a predetermined amount;
    means connecting the second control port of each of said plurality of fluid amplifiers to a separate pressure tap of said plurality of pressure taps;
    summing means having input means and an output, said summing means operable to produce an output signal of a magnitude dependent on the sum of the signals supplied to the input means; and
    means connecting the signal output of said plurality of fluid amplifiers to the input means of said summing means, whereby the output signal of said summing means is a unique indication of the position of the shock wave.
2. The apparatus of claim 1 further including means connecting the first control port of each of said plurality of fluid amplifiers to the pressure tap immediately upstream from the pressure tap to which the second control port of the amplifier is connected.
3. The apparatus of claim 1 further including means for supplying predetermined bias pressures to the first control ports of said plurality of fluid amplifiers.
4. The apparatus of claim 1 wherein the amplifiers of said plurality of fluid amplifiers are operable to produce fluid signals at the signal outputs thereof and wherein said summing means is operable to produce a fluid output signal of a magnitude dependent on the sum of fluid signals supplied to the input means thereof.
5. The apparatus of claim 4 including:
    further summing means having first and second inputs and an output, said further summing means operable to produce an output signal dependent on the algebraic sum of the signals supplied to the first and second inputs thereof;
    a reference signal source;
    means connecting the output of said summing means and said reference signal source to the first and second inputs of said further summing means;
    control means operable in response to an input signal to vary the pressure in the duct downstream from the shock wave so as to control the position thereof; and
    means connecting the output of said further summing means to said control means.
6. The apparatus of claim 1 wherein the amplifiers of said plurality of fluid amplifiers are operable to produce electrical signals at the signal outputs thereof and wherein said summing means is operable to produce an electrical output signal of a magnitude dependent on the sum of electrical signals supplied to the input means thereof.
7. The apparatus of claim 6 including:
    further summing means having first and second inputs and an output, said further summing means operable to produce an output signal dependent on the algebraic sum of the signals supplied to the first and second inputs thereof;
    a reference signal source;
    means connecting the output of said summing means and said reference signal source to the first and second inputs of said further summing means;
    control means operable in response to an input signal to vary the pressure in the duct downstream from the shock wave so as to control the position thereof; and
    means connecting the output of said further summing means to said control means.

References Cited

UNITED STATES PATENTS

| | | | |
|---|---|---|---|
| 3,086,357 | 4/1963 | Rubin. | |
| 3,102,387 | 9/1963 | Caspar. | |
| 3,163,981 | 1/1965 | Goodall | 137—15.2 |
| 3,237,857 | 3/1966 | Hatch. | |
| 3,302,657 | 2/1967 | Bullock | 137—15.2 X |

ALAN COHAN, Primary Examiner

U.S. Cl. X.R.
137—81, 84